US006999731B2

(12) United States Patent
Cronin

(10) Patent No.: US 6,999,731 B2
(45) Date of Patent: Feb. 14, 2006

(54) CONTROL OF AN ALERT MECHANISM BY COMMUNICATION OF AN EVENT-ASSOCIATED COMMAND

(75) Inventor: Thomas M. Cronin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 09/996,162

(22) Filed: Nov. 27, 2001

(65) Prior Publication Data

US 2003/0100336 A1 May 29, 2003

(51) Int. Cl.
*H04B 1/40* (2006.01)
(52) U.S. Cl. .................. 455/88; 455/556.2; 455/556.1; 455/418; 455/419; 455/420; 455/567; 340/7.58; 340/7.57; 340/7.62
(58) Field of Classification Search ............ 455/556.1, 455/556.2, 418, 419, 420, 567, 88, 404; 329/201; 340/7.58, 825.36, 7.55, 7.57, 7.6, 7.61, 7.62
See application file for complete search history.

(56) References Cited

U.S. PATENT DOCUMENTS 4,383,257 A * 5/1983 Giallanza et al. .......... 340/7.46
5,828,312 A * 10/1998 Yamazaki .................. 340/7.58
5,999,494 A * 12/1999 Holzrichter .................. 368/63
6,006,114 A * 12/1999 Seppanen et al. ........... 455/567
6,290,681 B1 * 9/2001 Brown ........................ 604/246
6,463,278 B1 * 10/2002 Kraft et al. ................. 455/418
6,574,471 B1 * 6/2003 Rydbeck ..................... 455/418
2003/0008644 A1 * 1/2003 Akhterzzaman et al. .... 455/418
2003/0100336 A1 * 5/2003 Cronin ....................... 455/556

OTHER PUBLICATIONS

Wrolstad, Jay, "Canada Tackles Cell Phone Jamming Controversy," Wireless NewsFactor; Mar. 13, 2001; http://wireless.newsfactor.com/perl/story/8116.html; 4 pgs.
Batista, Elisa, "Cellphones, Shut Up!," Wired News; Jul. 7, 2000; http://www.wored.com/news/print/0,1294,3737,00.htnl; 2 pages.
"Automatically Muting Your Mobile: Businesses to "SHHH" Cell Phone," http://www.eprairie.com/news/viewnews.asp?newsletterID=2027&page=1; 1 page, Sep. 10, 2001.

* cited by examiner

*Primary Examiner*—Sonny Trinh
*Assistant Examiner*—Huy Phan
(74) *Attorney, Agent, or Firm*—David L. Guglielmi

(57) ABSTRACT

A method and apparatus for associating a command with an event at a first device, communicating the command to a second device when the event occurs and causing an action at the second device depending on the command.

4 Claims, 1 Drawing Sheet

CONTROL OF AN ALERT MECHANISM BY COMMUNICATION OF AN EVENT-ASSOCIATED COMMAND

TECHNICAL FIELD

The present invention generally relates to the field of communicating devices, and more particularly to control of an alert mechanism of a device based on certain events occurring at another device.

BACKGROUND

A first class of portable devices that include a software-maintained calendar and a software-accessible clock that allow a user to keep track of a schedule of meetings, appointments, and other types of events, has become generally available and such the use of such devices is widespread. Such devices include notebook and sub-notebook computers, personal digital assistants, and pocket PCs among others. Some of these devices use volatile storage such as memory storage and some permanent storage such as hard disk drive or non-volatile memory storage to store such events. Each event such as a meeting or an appointment may have associated with it multiple attributes such as a name, textual information, image and sound files, priority levels, status of acceptance by attendees, among many others. Meetings and appointments may, for example, be characterized as face-to-face, web-based, or telephone meetings.

A second class of devices with alert mechanisms that may be audible, illuminating, or vibrating tactile alerts, among others, are now ubiquitous in both business environments as well as in the general public arena. Examples of such devices include cellular phones and portable paging devices, among many others.

These alert mechanisms serve a variety of purposes. In the case of cellular telephones, alert mechanisms such as a circuit to produce an audible alert, where such an alert is a ringing tone, a beep sequence or a musical tone sequence, may indicate the arrival of an incoming call. In other cases a similar alert may indicate the arrival of a text message at the cellular telephone. In other cases, the alert may indicate the meeting of a threshold condition, such as when a stock price of an equity traded at a stock exchange reaches a specific value. In the case of a portable pager, an alert mechanism being activated may cause a beeping tone to sound, a musical chime to be played, a light-emitting component to be switched on, or a tactile vibrating alert to be activated, when an incoming page is received, or in some cases when a clock internal to the pager reaches a predetermined time, in which case the device serves as an alarm clock.

A problem in the use of this second type of device, exemplified by a cellular telephone, is that users may not wish to have alerts enabled or perceptible at all times. For example, a person in a meeting may wish to not have a cellular telephone ring even if an incoming call is detected. Similarly, a person may wish to have his or her pager silenced for the duration of a theater performance or alternatively wish to have it set to alert that person in a tactile vibrating mode only. While devices with alert mechanisms such as the ones discussed do often have means allowing a user to manually disable the alert mechanism, doing so consistently in order to avoid disturbance at events sensitive to noise or other intrusive occurrences is error prone because of its manual nature. Similarly, a person who has disabled an alert mechanism for a sensitive event may omit, through human error, to re-enable it after the event has ended, resulting in a possible failure to receive an important alert.

The information about the times and durations of meetings and appointments that would be useful in providing an automated system of disabling or altering alert mechanisms in the second class of device, such as a cellular telephone, is often available to a user in the form of a stored schedule in the first class of device, such as a Pocket PC. Hitherto, however, no method known exists to automatically use such stored event information in one of the first class of devices in order to disable or alter an alert mechanism in one of the second class of devices in order to solve the problem of unwanted intrusion during sensitive events due to an alert.

DETAILED DESCRIPTION

Figure 1:
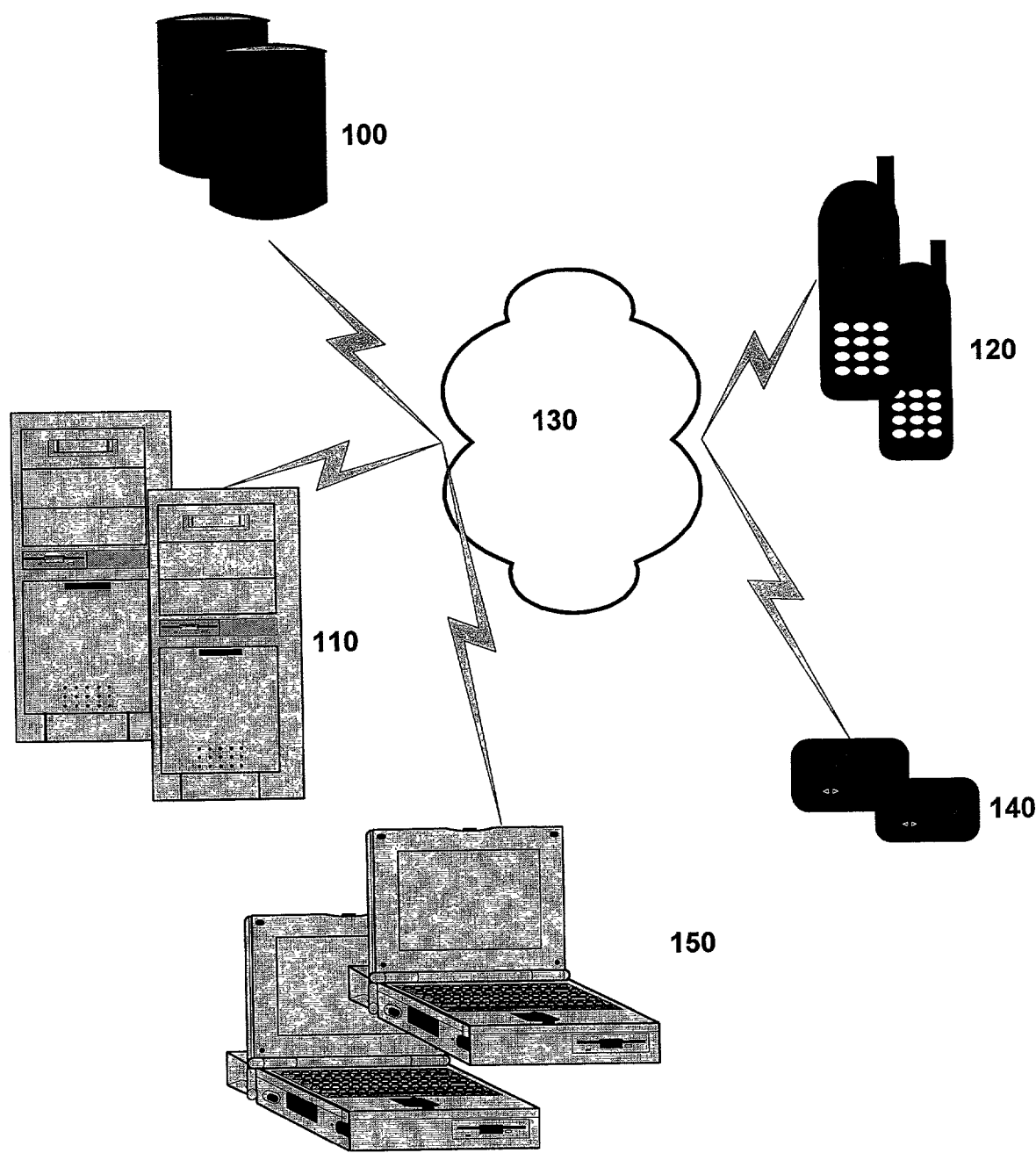
FIG. 1 is an exemplary system block diagram of one set of embodiments of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments Exemplary Embodiment. It is helpful to begin by considering one set of embodiments in order to understand the invention with reference to FIG. 1. In this embodiment, the first device is a computer, exemplified by a Pocket PC 100, a notebook 150, or other computer 110 such as a desktop PC on which is stored a schedule of meetings. The second device is a remote communication device such as a cellular telephone 120 or a pager 140. An occurrence of an event that detected by the first device is the approach or arrival of the date and time of the start of an event such as a specific meeting, determined by comparing the stored date and time associated with the meeting to the current time, determinable by the first device by accessing a clock. In association with the start of this meeting is stored an attribute indicating that the meeting is sensitive. Based on this attribute, a command to mute the beeper mechanism of the pager or the ringer of the cellular telephone is constructed by the first device. When the date and time of the meeting approach or arrive, the first device communicates this command to the second device using the wireless network 130. The second device receives the command and then performs the corresponding action, which is the disabling of its alert mechanism, which in this case is muting the ringer of the cellular telephone or the beeper of the pager. A similar sequence of events that re-enables the ringer or beeper may then be performed when the time for the end of the meeting arrives or passes and when the computer determines that this event has occurred.

System Description. In general, this invention seeks to control, in specific ways, an alert mechanism of a second device based on certain events occurring at a first device. In this regard, a general notion of a well-defined event detected by the first device is introduced. Further, associated with the detection of such an event is a command that can be communicated to a second device. At or around the time that the event occurs, a communication between the two devices causes the alert mechanism of the second device to be acted on in some manner consistent with the transmitted command.

First Device. The first device in one embodiment is a computer capable of accessing a stored schedule and storing events and attributes of events in association with the schedule. Specific examples of such a device include a notebook or sub-notebook computer 150, a Pocket PC 100, or a desktop computer 110. The first device is not limited to these embodiments, however; many other embodiments of the first device may exist, including any devices that incorporate within themselves the functionality of a computer system and storage system, such as a web appliance, smart television set-top box, or an on-board automotive computer system, among others.

Events. Well-defined events occur, detectable by the first device. In one embodiment, the beginning and the ending of any meeting on the stored schedule may each be defined as an event. In order for such a device to detect that such an event has occurred, it will in some embodiments compare times stored on the schedule with the clock time read from a software accessible clock. However, it is not necessary for a stored schedule to be present in order for an event to have occurred, as exemplified in one embodiment by a user-initiated action such as a button-press, or by the clock time merely reaching a specific value, as in a timer or countdown clock.

Command. When such a well-defined event occurs at the first device, a command associated with the event is then communicated to the second device. The command may be explicitly stored with the event on a stored schedule in some embodiments, or the first device may generate the command based on one or more of the attributes of the event, and the clock time at which it has occurred.

Action at Second Device. However constructed, the purpose of the command is to cause an action at the second device. The action in turn is to enable, disable, or modify a setting of the alert mechanism of the second device. In some embodiments, where the event is an event on a stored schedule, the action may additionally activate the alert mechanism of the second device, if the alert mechanism is enabled.

Second Device. In some embodiments the second device may be a cellular telephone, in others a portable pager. It may be another computer such as a Personal Digital Assistant, a Palm Pilot, or a Pocket PC.

Alert Mechanism. In one embodiment the alert mechanism may be a ringer, beeper or buzzer circuit. The alert mechanism may be a circuit to produce an audible tone sequence or a musical tone, a flashing or illuminating light emitting diode, or a vibrating mechanism among others, or it may combine one or more of these types of alert mechanism into a multi-modal alert mechanism with a selectable mode of operation, such as a tactile vibrating mode, an audible mode, or a silent illuminating mode. In some embodiments the multi-modal alert mechanism may be set to a particular mode of operation in response to the command received at the second device. The alert mechanism may be capable of being disabled or enabled in response to the command received at the second device. The alert mechanism is disabled if it is set so that it does not operate to produce an alert even when an alert occurs. The alert mechanism is enabled if it is set so that it operates to produce an alert when an alert is appropriate.

The alert mechanism is activated when it is caused to produce an alert. The alert mechanism of the second device may be activated in a number of different ways. In some embodiments, as in the case where the second device is a telephone or pager, the alert may be activated by an incoming call or page from a third device such as another telephone. In some embodiments, the alert mechanism may be activated by an internal event at the second device such as the arrival of a specific clock time or the expiry of a countdown timer. The alert mechanism may in another embodiment be activated by a signal from an embodiment of the first device as discussed above.

In some embodiments the alert mechanism may have a variable intensity, for example a variable volume level for an audible alert or a variable brightness level for an illuminating alert. In some embodiments the variable intensity may be variable from some maximum level to a minimum level that is imperceptible such as a mute level for an audible alert or a dark level for an illuminating alert. In some embodiments with a variable intensity of the alert mechanism, the intensity may be varied in response to the command from the first device.

Communication. Communication of the command from the first device to the second device may also take place in many different ways. In some embodiments, the first device may transmit the command to the second device after the occurrence of the event either by broadcast or by point-to-point communication. In some embodiments, the second device may send a polling message at intervals to the first device and the first device may respond only if an event has occurred. In some embodiments, the second device may query the first device to check if an event has occurred only when an alert is requested from the second device.

The medium of communication of the command in some embodiments would be a wired digital network such as an IEEE 802.3 Ethernet. In some embodiments such as those pictured in FIG. 1, the medium of communication is a wireless network 130 such as an IEEE 802.11b network. Some embodiments may implement alternative methods for communicating the command including but not limited to infrared signaling and optical signaling between the first and the second device.

In general, other variations of the system described above are possible in some embodiments. For example, in one embodiment, a single instance of the first device may control the alert mechanisms of multiple different instances of the second device, such as in the case of one Pocket PC sending a command to mute all of the cellular telephones equipped to receive the command within range of the communication sent by the Pocket PC. In another embodiment, a single instance of the second device may respond to commands from multiple different instances of the first device. These two embodiments in combination yield another embodiment in which multiple instances of the first device send commands to multiple instances of the second device. In such embodiments, different modes of communication between devices may simultaneously be present. For example, one instance of the first device may communicate using a wireless radio-frequency network such as an IEEE 802.11b while another may communicate using a wireless infrared network. Further a device in some instances may be equipped to use different media to communicate with other devices in different instances of this system.

Implementation of Methods. The present invention includes various steps. The steps of the present invention may be performed by hardware components, or may be embodied in machine-executable instructions, which may be used to cause a general-purpose or special-purpose processor or logic circuits programmed with the instructions to perform the steps. Alternatively, the steps may be performed by a combination of hardware and software. The present invention may be provided as a computer program product that may include a machine-readable medium having stored thereon data which when accessed by a machine may cause the machine to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
   associating a command with a scheduled event on a stored schedule that is accessible by a personal digital assistant, wherein associating the command further comprises constructing the command depending on one or more of a clock time and the scheduled event;
   communicating the command to a cellular telephone when the scheduled event occurs, wherein determining when the event has occurred further comprises
   determining a clock time from a clock,
   accessing the stored schedule,
   determining from the stored schedule whether the scheduled event is associated with the clock time;
   causing an action at the second device depending on the command, the action comprising at least one of:
   disabling an alert mechanism of the cellular telephone;
   enabling the alert mechanism of the cellular telephone; and
   modifying a setting of the alert mechanism of the cellular telephone; and
   if the alert mechanism of the cellular telephone is enabled, activating the alert mechanism of the cellular telephone in response to an alert being required, wherein the alert mechanism of the cellular telephone comprises a ringer, wherein disabling the alert mechanism of the cellular telephone comprises muting the ringer, wherein communicating the command comprises transmitting the command from the personal digital assistant to the cellular telephone, over a wireless network.

2. A machine accessible medium on which is stored data that when accessed by a machine causes it to perform the method of claim 1.

3. A method comprising:
   associating a command with an event at a first device;
   communicating the command to a second device when the event occurs;
   causing an action at the second device depending on the command, the action comprising at least one of:
   disabling an alert mechanism of the second device;
   enabling the alert mechanism of the second device; and
   modifying a setting of the alert mechanism of the second device; and
   if the alert mechanism of the second device is enabled, activating the alert mechanism of the second device in response to an alert being required, wherein communicating with the second device further comprises:
   sending a polling message from the second device to the first device;
   receiving the polling message at the first device; and
   in response to the polling message, receiving a message comprising the command from the first device.

4. An apparatus comprising:
   a first device to associate a command with an event and to transmit a message comprising the command, wherein the first device is a personal digital assistant;
   a second device to receive the message and to perform an action depending on the command, wherein the second device is a cellular telephone;
   an alert mechanism of the second device with one or more of
   a capability to be enabled in response to the command;
   a capability to be disabled in response to the command; and
   a setting, modifiable in response to the command,
   wherein the alert mechanism, if the alert mechanism is enabled, is capable of being activated in response to an alert being required, wherein the alert mechanism is a ringer of the cellular telephone;
   a storage component accessible by the first device, to store a schedule, wherein the event further comprises a scheduled event stored in the schedule; and
   a clock to provide a clock time to one or more of the first device and the second device.

* * * * *